United States Patent
Simon

(12) United States Patent (10) Patent No.: US 6,546,398 B1
(45) Date of Patent: Apr. 8, 2003

(54) PROCESS FOR PRODUCING A SELECTION MASK FOR ACCESSING DATA ON A DATABASE BY WAY OF PROGRAMMABLE INFORMATION OBJECTS

(75) Inventor: Pal Simon, Hachenburg (DE)

(73) Assignees: Aryo GmbH (DE); Internetx GmbH (DE)

(*) Notice: Subject to any disclaimer, the term of this patent is extended or adjusted under 35 U.S.C. 154(b) by 293 days.

(21) Appl. No.: 09/694,292

(22) Filed: Oct. 23, 2000

(30) Foreign Application Priority Data

Oct. 21, 1999 (DE) .......................... 199 52 630

(51) Int. Cl.⁷ .............................. G06F 17/30
(52) U.S. Cl. .......................... 707/103; 707/1
(58) Field of Search ................. 707/103, 102, 707/101, 100, 10, 104, 3, 1, 2; 380/30; 379/93.15

(56) References Cited

U.S. PATENT DOCUMENTS 5,838,965 A * 11/1998 Kavanagh et al. ...... 707/103 R
6,005,939 A * 12/1999 Fortenberry et al. .......... 380/30
6,094,659 A * 7/2000 Bhatia ..................... 379/93.14

FOREIGN PATENT DOCUMENTS

| DE | 196 10 637 A1 | 3/1996 |
| DE | 197 23 479 A1 | 6/1997 |
| DE | 199 17 344 A1 | 4/1999 |

* cited by examiner

*Primary Examiner*—Sanjiv Shah
(74) *Attorney, Agent, or Firm*—Pendorf & Cutliff

(57) ABSTRACT

Process for producing a selection mask for accessing data in a data bank with the help of programmable information objects. In known systems, the user after access of a selection mask (information page, web page) by way of selection elements (descriptors, markings, hyperlinks) step-by-step approaches a document to be found by way of menu based or query based search engines. These search engines are either cumbersome and/or the user obtains a document with a lot of ballast. In contrast, the invention, on the basis of an individually adjustable selection mask (dynamic web page) which is created by the user in dialogue with a server, uses dynamic, which means not preset, individually adjustable, intelligent information elements (dynamic LINK).

9 Claims, 3 Drawing Sheets

Figure 1A:
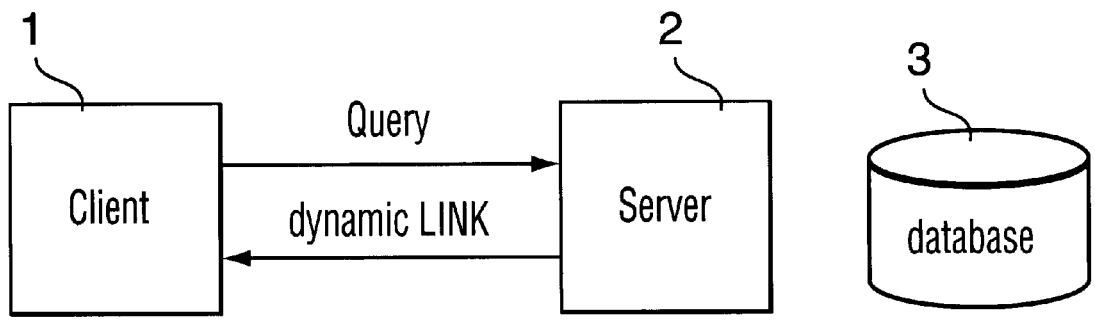

PROCESS FOR PRODUCING A SELECTION MASK FOR ACCESSING DATA ON A DATABASE BY WAY OF PROGRAMMABLE INFORMATION OBJECTS

FIELD OF THE INVENTION

The invention relates to a process for producing a selection mask for recalling data from a database with the help of programmable information objects by way of a communication network and a central server. In particular, the invention relates to so-called client-server-systems on the Internet, whereby information can be recalled from an almost incalculable number of databases and information pools.

BACKGROUND ART

Database services are known through which by way of a search mask, descriptors, alphanumeric symbols or other selection criteria with additional temporal and territorial limitations and/or logical operations of those selection criteria very specific, redundancy free documents can be searched and/or assembled.

In contrast, with Internet services it is comparatively easy to display on screens of terminals pages (information, data) from computers (servers) reachable through the Internet service. The calling up of those pages is carried out by way of a program in the form of a web or WWW browser (for example Internet Explorer from Microsoft or Navigator from Netscape).

The pages accessed this way can include, apart from text and graphics, so-called links (Hyperlinks, LINK) which make it possible to go to a preset page on the Internet by clicking with a mouse without having to enter a destination address of the page in the form of alphanumeric symbols.

The links (Hyperlinks, LINK) consist for example of underlined or colored words (for example COMPANY X) or of so-called banners which normally have the shape of a rectangular window which includes a graphic.

It is known to reach a preset page on the Internet by marking a link for example by double-clicking with a mouse. For example, in the Lycos search server, a marking of the hyperlink "Wissenschaft" leads to a page with several hyperlinks, amongst which is the hyperlink "Naturwissenschaften". If this hyperlink is marked, a page is called up which includes several catalog entries amongst which is the catalog entry "Astronomie.de". By marking the latter, pages of WWW servers can be called up which deal with the subject astronomy.

The so-called "surfing" on the Internet is made possible by this "jumping" through links from one web side to the next. Although this may be interesting for many users just like leafing through a dictionary, it does not lead to a fast, goal oriented result. The use of so-called intelligent "robots" or "agents" assists the user in finding information, but does not reduce the amount of data which are transmitted in the end.

Links on web sites are also known which when clicked once with the mouse lead to the display of additional information. This additional information includes details on the content of the page or page sequence which can be called up. The respective page or page sequence is then called up by double-clicking with the mouse. The corresponding amount of data which is then transferred to the computer of the user (client) can be comparatively very large so that correspondingly long transmission times are required. Upon long transmission times, users who have no knowledge of the remaining transmission time often tend to interrupt and stop the ongoing transmission. This is a further disadvantage of the transmission of such large amounts of data that the user in many cases is not interested in the total amount of the transmitted data, but only in a part of those data.

The most important problems of the Internet result from the growing amount of information which can be loaded up very often without previous information. Few possibilities exist for the user to pre-judge information to be loaded in regards of quality and quantity. Superfluous information is often downloaded which can then not be processed in such amount because of lack of time of the Internet user.

A process for the exchange of data in a network is disclosed in DE 197 23 479 A1, wherein by way of a directed inquiry to the server the latter assembles from databases a document which is tailored to the search phrase.

It is a disadvantage of that invention that the searching user (client) is here also tied to a search scheme which he can no longer influence. The selection of the relevant data takes place in the server through a preset program which cannot be changed by the client.

The invention according to DE 196 10 637 A1 provides a means for the menu guided navigation in a complex data collection wherein a three-dimensional body is placed on the terminal of an information system as navigation means. For this menu structure, a specific portion within a large data collection can be found and called up in a clear manner.

This search system is also bound to a preset search mask by which a relevant document can be selected from a data collection in three dimensions instead of only two dimensions as previously.

These known search systems are not sufficiently flexible for multimedia systems and especially for individual collections of information adapted to different requirements as well as the downloading thereof from a multitude of different databases, and the search results are still burdened with unnecessary redundancy.

Furthermore, a data base administration system is known from Microsoft under the name "Access" with which different data sets can be coupled in SQL database systems according to the client-server-principle.

Access includes its own programming language and is not loaded onto a web page from the Internet. Such a query program is complicated in view of the possibilities of current technology and is practically not usable for the average user on the Internet.

Example of adjustable hyperlinks, LINKS for the downloading of data from the database are known from the applications of the current applicant, serial numbers P 199 17 344.3 and P199 34 092.7. It can however not be derived according to which process they are created and how new web pages are created.

SUMMARY OF THE INVENTION

It is an object of the invention to provide a process for the production of a selection mask for the downloading of data from a database with the help of programmable information objects especially for the downloading of data through the Internet, wherein the query procedures adapted to the requirements of users are made possible in a relatively simple manner.

In known systems, the user after calling up a selection mask (information page, web page) through selection elements (descriptors, markings, hyperlinks) slowly step-by-step approaches the document to be searched.

Each selection element (for example LINK) points exactly to one or more documents which are saved in a rigid, preset way (statically) in a database. Or the user attempts to select one or more specific documents with a more or less complex search phrase. The result in the end remains a rigidly set document or limited portions thereof (for example only summary or pages 3–6).

In contrast, the invention uses dynamic, which means no longer rigidly preset, individually adjustable selection elements (dynamic LINK) on the basis of an individually adjustable selection mask (dynamic web page), which is created by the user through a dialogue with a server.

A dynamic LINK is a teachable, programmable information object which represents part of a possible document which after adjustment of the dynamic LINK is produced. Several dynamic LINKS thereby represent a complete new document.

Several types and arrangements of the dynamic LINKs are conceivable which are assembled and adjusted by themselves or together:

the dynamic LINK carries out known adjustments which regards every document and which are infinitely adjustable (for example only little text, a lot of text, text with little graphics, text with many graphics);

the dynamic LINK represents possible adjustments regarding a selection mask to be created (web page), which are downloaded from a storage and displayed for selection and configuration on the screen of a terminal (client). With the selection mask so adjusted (Web page) the desired document is assembled (for example, the user searches exclusively for music of one media company and has previously set the LINK to music);

a dynamic LINK which is often used by a user is displayed as standard setting at a suitable location in the selection mask so that the user does not have to continuously make adjustments (or example the standard setting of a LINK is set to "German" and all documents which are selected are produced and displayed in "German");

Before a new selection mask is created and/or the data are downloaded from the database, the user (client) first enters an interactive selection relationship with the server.

Upon request by the user, a variable selection mask with individually adjustable selection elements (dynamic LINK) is made available by the server. These dynamic LINKs give the user the possibility not to deal with individual complete information objects (for example static web pages available complete), but to assemble a not yet existing selection mask (web page) through the dialogue with the server from individual information blocks on the basis of functions, macros and/or sorting parameters, with the help of which selection mask he can then extract data in a controlled manner from a multitude of worldwide available databases.

The individual information building blocks of the selection masks or web pages therefore are changeable programs for the data selection.

The server sends to the client the programmable information object provided with information. This programmable information object includes already a selection of parameters which are selectable and adjustable. Although here too many or too few things are adjustable, the circle can be narrowed by repeated interaction between the server and the client for the transfer of new programmable information objects.

It is not always necessary to exchange complete programmable information objects between the client and the server, but it is sometimes also sufficient to exchange and/or supplement only individual parameters or also partial building blocks.

The web page building blocks are practically provided, for example, with so-called meta-data (information on information) which are passed along with the individual building blocks in the form of meta-tags and separate from "body" and "header" details. This information is not integrated into the dynamically produced web page. An extension of the well-known "Dublin core" can be used herefor.

The Dublin core provides for 15 elements which can be used as commonly understandable labels of meta-tags.

The user normally communicates repeatedly with the server (depending on the complexity of the query) until the selection mask is programed in such a way that the server pulls the desired range of information from the data bank on the basis of this dynamic web page.

By repeated interaction between client and server, sort parameters are set through programmable, teachable information objects (dynamic LINKs) which then produce a new selection mask (web page) from a large amount of information building blocks.

The dynamic LINK which is part of a completed with page, can be made as complex as desired. It can arrive at the client as a teachable intelligent program and, before it is returned to the server, can interact with the user.

With respect to the Internet, static or quasi-static web pages no longer exist, only a selection of building blocks, which determine possible web pages. The web page is determined by the user through identified parameters of a dynamic LINK. The classic web page thereby corresponds in this case to the standard adjustment of the dynamic link which is initially sent by the server to the client.

In a further embodiment of the invention, the dynamic LINK can also be adjusted by voice command, for example, when a voice recognition system is connected therewith for that purpose. In the end it is unimportant how information is entered and forwarded to the LINK.

If security is required, the entry can be complemented with user specific recognition characteristics (fingerprint, face recognition, voice verification or the like).

It is possible with the new process in accordance with the invention to not only pull redundancy free data or information, from a database, but it is also possible for the user to assemble a new own web page from the present and changeable information building blocks.

DETAILED DESCRIPTION OF THE PREFERRED EMBODIMENT

Preferred embodiments of the solution in accordance with invention are further described by way of drawings.

Figure 1B:
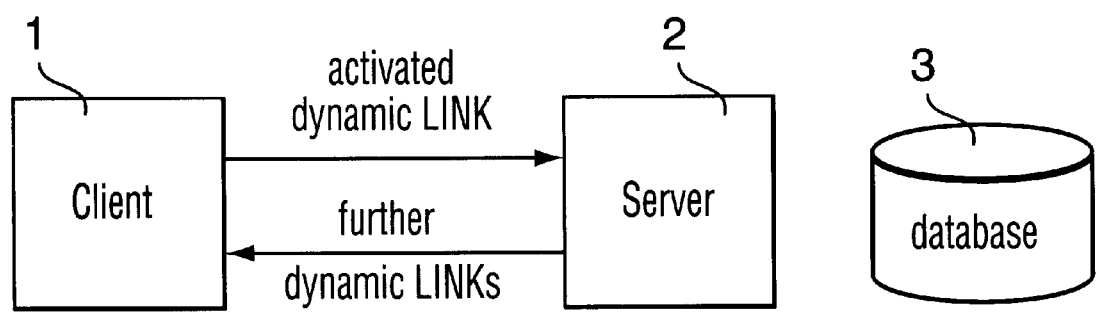
Figure 1C:
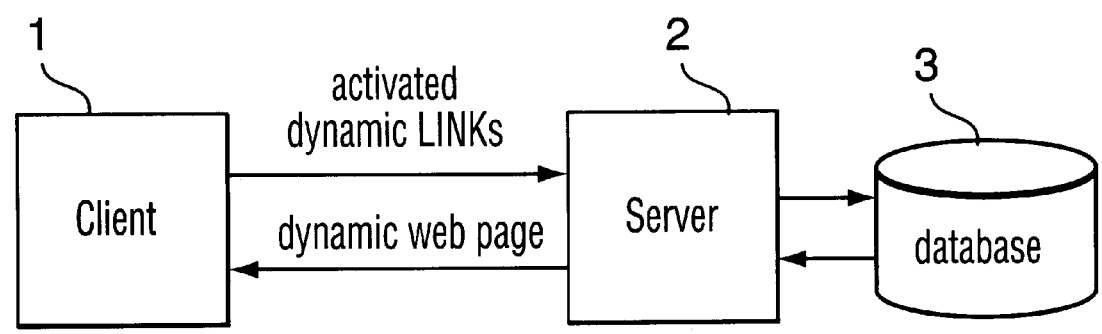
Figure 2:
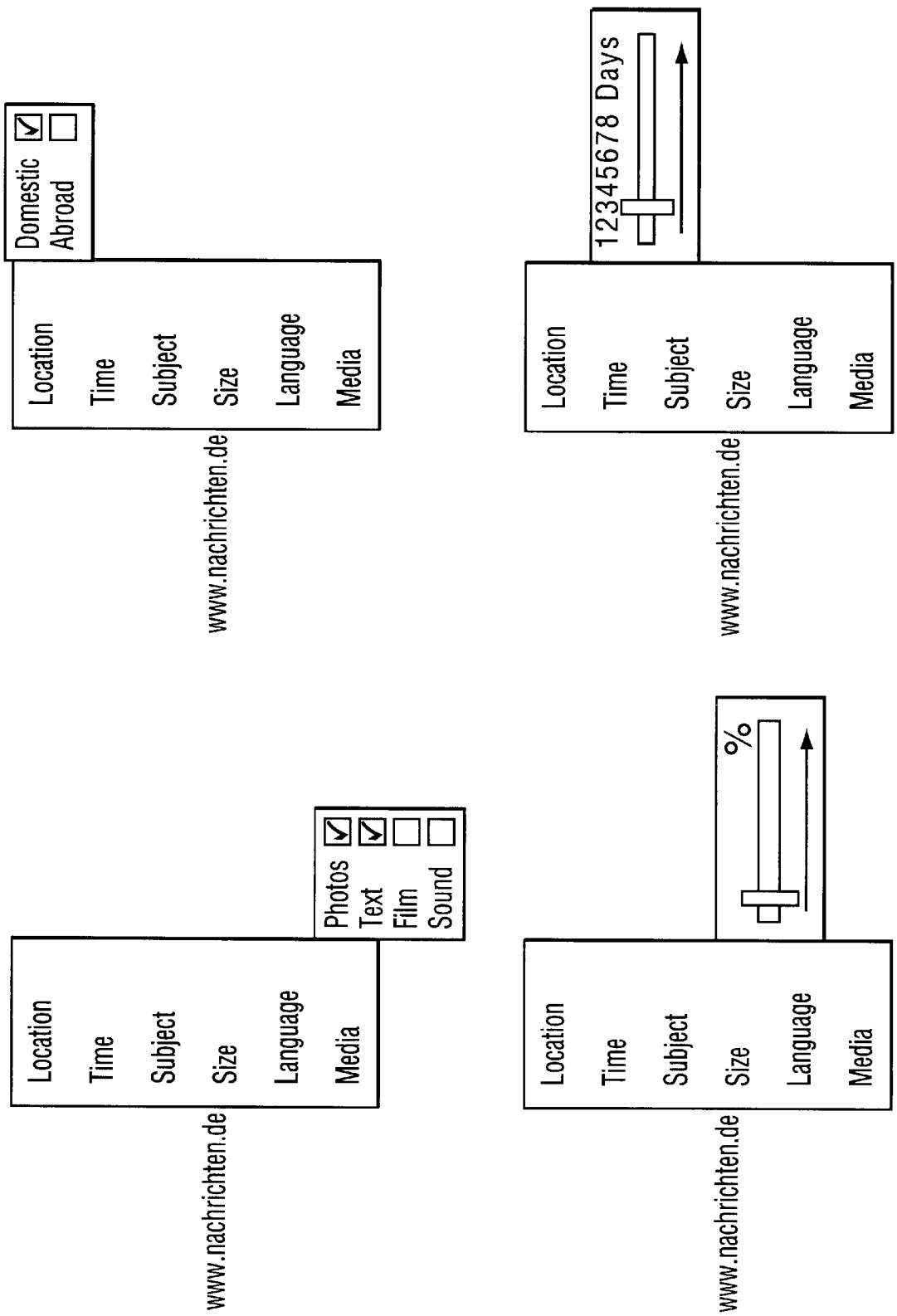
Figures 3, 4:
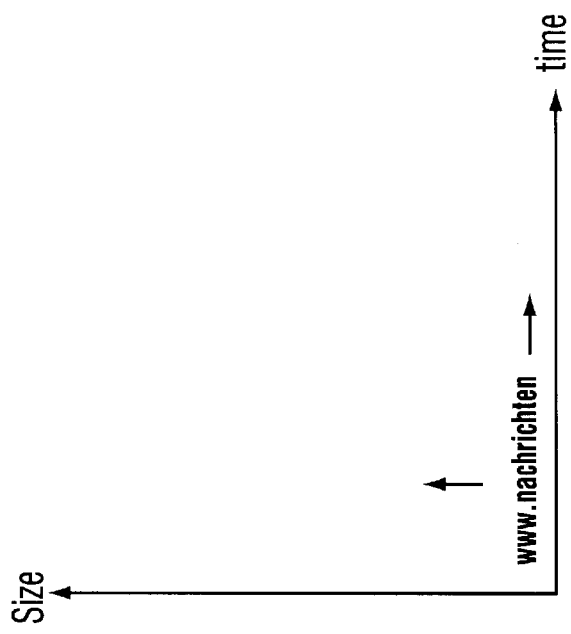

It shows:

FIGS. 1a to 1c a schematic illustration of the process;

FIG. 2 the structure of possible selection mask's according to the process with the information objects in different arrangements;

FIG. 3 a selection mask with a completed dynamic link;

FIG. 4 the possibility of different quantification of information objects according to size and time.

FIGS. 1a to 1c show in schematic illustration the process sequence as carried out, for example, through the Internet communications system. In this case, the data access terminal 1 with its programs is referred to as client and the central processing unit 2 is referred to as server. The database 3 which is to be accessed in a controlled manner is a multitude of worldwide offered data collections which respectively consist of a large amount of information blocks with "body" and "header" details.

In the first process step (FIG. 1a) a selection mask with teachable, programmable information objects (dynamic LINKs) is made available by the server 2 upon a query by the client 1.

In the second process step (FIG. 1b) the activatable dynamic LINK is sent by the client 1 back to the server 2 and, if required, which is normally the case with complex queries, further teachable, programmable information objects (dynamic LINKs) are ordered from the server 2.

The first and second process steps can be sequentially repeated many times.

In the third process step (FIG. 1c) a new web page is produced from the program information objects (dynamic LINKS), which represents a program for a controlled data selection according to the user requirements.

In a fourth process step (also FIG. 1c) a program is activated by the client 1 in the server 2 after activation of the dynamic LINKs in the new web page, which program starts an algorithm in the databases 3 that produces a new redundancy free document, consisting of data which are selected from one or more databases 3 in different quality and quantity, and only this new document is transmitted to the client 1.

For example, in the first process step the word "Nacbrichten" was entered, which in principle already represents a limited query. The server 2 sends the querying unit (client) 1 a dynamic link which, for example, in a first selection includes the following adjustable parameters which it already knows:

Since when—location—media type—size

The server 2 can, for example, not yet differentiate between politics and science.

The querying party then adjusts the link (by voice, keyboard or any other means):

one week—abroad—text—detailed or today—domestic—film—short

That option is then sent back to the server.

Should this be sufficient, the server 2 does not need to send any further dynamic LINKs back to the client 1. It also sends the parameters to the database and retrieves all documents which are provided in the "header" with date not older than a week abroad text short.

A web page is then assembled with these parameters. This can take place on the client 1 as well as on the server 2.

However, further options can be desired before the LINK is sent back to the server 2. In this case, further options are marked, for example in a text box. The dynamic LINK is thereby supplemented or even further dynamic LINKs are ordered, for example, about politics, science, highways and so on.

FIGS. 2 to 4 shows three possible embodiments of a dynamic LINKS

Further variants will be apparent to the person skilled in the art once familiar with the present process. It must always be kept in mind that the dynamic LINK can be parameter labeled in certain dimensions (location, territory, time, subject, size, language, multimedia components, and so on).

An example of a LINK is shown in FIG. 2 as adjustable by Windows adjustments.

After a query with "WWW.nachrichten.de" a selection mask is made available in which different options can be adjusted through the LINK. Upon clicking with the right mouse button different selection parameters and/or changeable graphical illustrations (for example sliders) appear with which the LINK can be quantitatively adjusted.

FIG. 3 shows an example of a completed dynamic LINK as illustrated on the screen of a data access terminal (client) 1. It is first loaded after calling up the web page "WWW.nachrichten.de" and adjustments are carried out as in FIG. 2.

The illustration according to FIG. 4 indicates that it is possible to change a parameter not only in one dimension, but simultaneously in two dimensions. Even a three-dimensional arrangement as, for example, provided in the DE 196 10 637 A1, is conceivable.

What is claimed is:

1. A process for producing a selection mask for accessing data on one or more databases With the help of programmable information objects, especially for use in large communications networks including, client-server-systems on the internet, wherein the accessing of data is carried out through the electronic communication network with a data access terminal, a central processing unit between the data access terminal and the one or more databases for connecting the data access terminal with the one or more selected databases, the data access terminal having an optical display arrangement, a data entry arrangement and a control processor with associated control program adopted for the communication through the electronic communication network, the databases also including a control processor with associated control program adapted to the electronic communication network, selection masks with information objects which are displayed on and selectable on the display arrangement of the data terminal and/or a search query being assembled from pre-selected search criteria which are understood by the database, whereby these information elements and/or search criteria trigger pre-selected processing programs for the assembly of a redundancy free document within the central processing unit and/or in the control processors in the one of the several databases, which document is transferred to the querying data terminal through the central processing unit, characterized in that a selection mask with teachable, programmable information objects is provided in the first processing step by the central processing unit upon query of the data access terminal, the information objects activated and programmed into the data access terminal are sent back in a second process step to the central processing unit and further teachable, programmable information objects or portions thereof including adjustable parameters are requested, the first and second process steps are successively repeated one or more times a new selection mask is produced in a third process step from the activated and programmed information objects which represents a program for a directed data selection corresponding to the requirements of the user; and an algorithm for the creation of a new redundancy free document is triggered in a fourth step on the basis of the information objects in a new selection mask in the central processing unit and/or the control processors in the databases, which document consists of data selected from the one or more databases in a different quality and quantity and only this new document is transferred to the data access terminal.

2. Process according to claim 1, wherein the teachable, programmable information objects in the server (2) are selectable, preprogammed information building blocks, which are assembled in the data access terminal (client) (1) to the new selection mask (web page).

3. Process according to claims 1 and 2, wherein the information objects of the selection mask (web page) are provided with meta-tags and the data in the databases (3) are provided with "body" and "header" data.

4. Process according to claim 1, wherein the teachable, programmable information objects are changeable dynamic LINKs.

5. Process according to claim 1 wherein the changeable dynamic LINKs can be adjusted by way of a keyboard, a mouse, voice or other known input possibilities.

6. Process according to claim 4, wherein that the dynamic LINKs carry out known adjustments, which are with respect to each document and are infinitely adjustable.

7. Process according to claim 4, wherein the dynamic LINKs represent possible adjustments with respect to a selection mask to be produced (web page) which are downloaded from a storage and displayed on the screen in the client (1) for selection and configuration and the desired document is assembled by way of the so adjusted selection mask (web page).

8. Process according to claim 4, wherein the dynamic links often used by the user are displayed as standard adjustments at a suited location in the selection mask to avoid having to continuously make new adjustments.

9. Selection mask according to claim 1, further comprising one or more dynamic LINKs which are adjustable in one, two or more dimensions.

* * * * *